United States Patent
McMahon

[15] 3,676,798
[45] July 11, 1972

[54] COOLING SYSTEM FOR LASING MEDIA

[72] Inventor: Donald H. McMahon, Carlisle, Mass.
[73] Assignee: Sperry Rand Corporation
[22] Filed: Oct. 13, 1969
[21] Appl. No.: 865,910

[52] U.S. Cl. .................................. 331/94.5, 165/185
[51] Int. Cl. .......................... H01s 3/04, F28f 7/00
[58] Field of Search ................................. 331/94.5

[56] References Cited

UNITED STATES PATENTS

| | | | |
|---|---|---|---|
| 3,387,227 | 6/1968 | Mastrup et al. | 331/94.5 |
| 3,339,150 | 8/1967 | Bowness | 331/94.5 |
| 3,339,151 | 8/1967 | Smith | 331/94.5 |
| 3,471,801 | 10/1969 | Woodbury et al. | 331/94.5 |
| 3,361,989 | 1/1968 | Sirons | 331/94.5 |
| 3,353,115 | 11/1967 | Maiman | 331/94.5 |

OTHER PUBLICATIONS

Holland, " Thermal Conductivity . . . Materials," J. App. Phys. Vol. 33, No. 9, Sept. 1962, pp. 2910– 2911.
" Thermal Conductivity of . . . Optical Materials" AIP Handbook, 2d. ed. p. 4– 94.
Levine, " Lasers," Vol. 1, Marcel Delker pub. co. (New York) 1966, pp. 137– 153, 177– 180.

*Primary Examiner*—William L. Sikes
*Assistant Examiner*—R. J. Webster
*Attorney*—S. C. Yeaton

[57] ABSTRACT

Heat generated within a lasing medium operating in a laser pumping cavity is efficiently removed from the pumping cavity by use of a heat sink located exterior of the cavity. A tube formed of a single crystal of sapphire surrounds the laser medium and extends through an end wall of the pumping cavity. There, the sapphire tube is in turn surrounded by a metal heat exchanger element that may be operated at cryogenic temperatures. Undesired condensation is prevented from forming adjacent the laser medium by forming the pumping cavity as a sealed chamber and evacuating it to a relatively low gas pressure.

2 Claims, 3 Drawing Figures

Patented July 11, 1972

INVENTOR
DONALD H. MC MAHON
BY
ATTORNEY

INVENTOR
DONALD H. MC MAHON
BY
H P Terry
ATTORNEY

COOLING SYSTEM FOR LASING MEDIA

BACKGROUND OF THE INVENTION

1. Field of the Invention

The invention pertains to means for the generation of electromagnetic energy by stimulated emission of such radiation. A laser medium capable of producing stimulated emission is disposed in an optical pumping chamber. When subjected to the intense pumping energy, the temperature of the lasing medium may increase greatly if thermal energy is not efficiently removed from it. Therefore, the invention particularly pertains to means for the efficient, convenient removal of thermal energy from the laser medium for disposal exterior of the pumping cavity.

2. Description of the Prior Art

One problem that has been experienced with the use of solid state lasers operating at relatively high energy levels is that when the laser medium is subjected to the intense energy of a pumping lamp in a confining laser pump cavity, the temperature of the laser medium may reach relatively high levels. Efficient removal of such thermal energy is required, especially as a high temperature in the lasing medium may either reduce the efficiency of useful transfer of energy within the lasing medium or may even prevent lasing operation entirely.

Certain types of lasers may even require operation at depressed temperatures. For instance, some types of garnet lasing materials operate efficiently in the region of 77° Kelvin, but do not operate at all, or operate only at a low efficiency level at 300° Kelvin (room temperature).

Operation of these devices has indeed been demonstrated in the past, though with relatively crude arrangements which lack the attributes of convenience and versatility required of commercially acceptable apparatus. For example, garnet and other lasing media have been operated at cryogenic temperatures in equipment in which a bulky Dewar vessel is placed actually within the pumping cavity. The inherent size of the Dewar vessel has placed severe restrictions on the design of the pumping cavity and has prevented the supply of compact equipment convenient for use in many applications.

Furthermore, components of the liquified gas used as the cooling agent tend to recondense on surfaces adjacent the lasing medium. Such is evidently true also of certain components of room air which may be present. The use of the Dewar vessel in providing the necessary cooling has prevented effective control over the undesirable formation of condensate adjacent the lasing material. The presence of such condensate also undesirably limits the efficiency of operation of the lasing material.

SUMMARY OF THE INVENTION

The present invention relates to a laser device of the type using a crystalline rod of optically active material whose ends are polished, parallel, and coated with a thin film of material for at least partially reflecting light and whose cylindrical sides are transparent to pump radiation. The latter radiation excites ions in the crystalline rod to emit radiation which travels along the rod and is amplified as coherent radiation. The substantial amount of pumping power which appears as heat within the lasing medium is removed therefrom by use of a composite rod structure having a core of laser material covered by a sheath of transparent optically refractive material. The structure facilitates cooling by removing thermal energy from the vicinity of the lasing material to a remotely located, cryogenically cooled, metallic sheath forming the core of a second heat exchanger. Heat flow is efficiently carried out by longitudinal flow of energy along the transparent sheath, rather than merely radially through its surface. The invention enables the practical use of a convenient configuration for the laser system, in which parts primarily concerned with cooling are located exterior of the pump cavity and its design is then dictated primarily by considerations of what is required for efficient stimulation of emission in the laser material. Furthermore, the pump cavity may be conveniently evacuated or filled with a suitable inert gas for preventing interference with the operation of the laser because of formation of condensate.

DESCRIPTION OF THE PREFERRED EMBODIMENT

Figure 1:
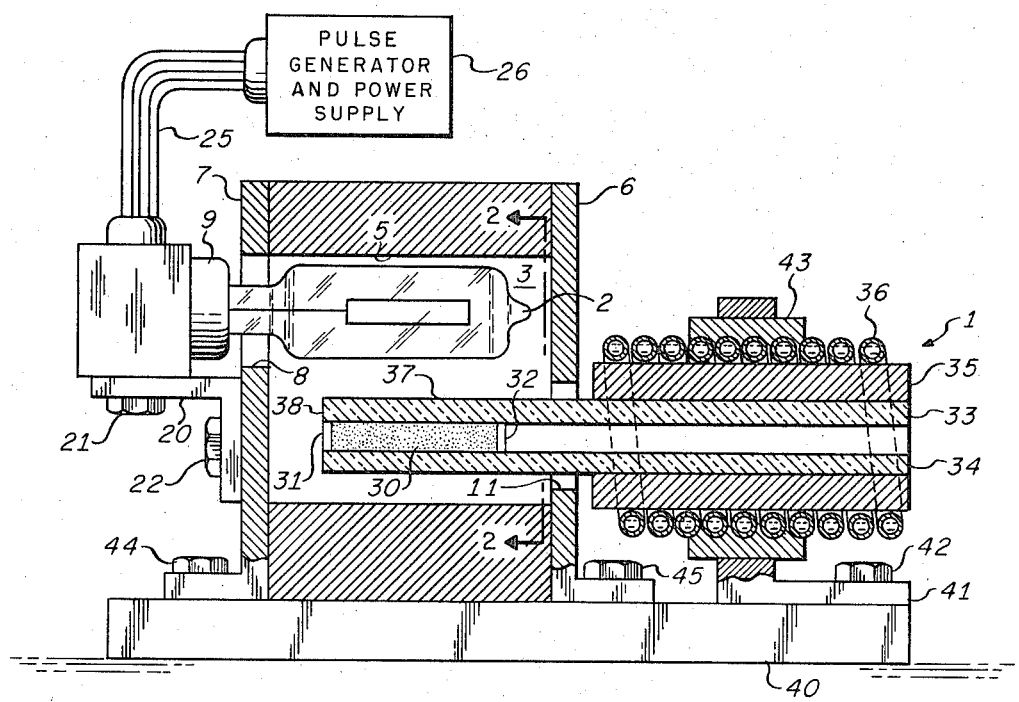
FIG. 1 is a view partly in section of a laser device embodying the principles of this invention.

Referring to FIG. 1, there is presented a laser device according to the present invention which includes as principal elements a composite lasing and cooling configuration 1, a high intensity lamp 2 for stimulating lasing action in configuration 1, and an optical pumping cavity 3 surrounding a portion of the composite lasing-cooling configuration 1 and the pumping lamp 2. The wall 5 of the optical cavity 3 is elliptical in cross-section, as is shown clearly in FIG. 2. The cavity 3 is defined in part by an enclosure or casing 4 having the inner elliptically contoured wall 5 and closed at its ends by apertured flat end walls 6 and 7.

Aperture 8 in end wall 7 provides means for inserting within the cavity 3 an emission stimulating or pumping lamp 2. Lamp 2 is illustrated as mounted in a socket 9 supported on a bracket 20 from end wall 7 by suitable fasteners 21 and 22.

Depending upon the choice of lamp 2, it is supplied with pulsed electrical energy or any other necessary operating power in a known manner via a plurality 25 of electrical leads connecting the lamp socket 9 to a pulse generator and power supply 26 which may both be of conventional nature. Lamp 2 may be, for example, a conventional zenon or other gas lamp which is known on the market as a lamp for producing highly intense pulses of light. Certain tungsten and other lamps are also useful.

The second apertured wall 6 forms an end wall for cavity 3 opposite end wall 7. A portion of the combined lasing-cooling structure 1 projects into the cavity 3 through aperture 11 in end wall 6. The combined lasing-cooling structure 1 includes a rod 30 of active laser material. The laser material of rod 30 and the light producing electrode of lamp 2 are conventionally placed at opposite focal points of the elliptical cavity wall 5.

The combined lasing-cooling structure 1 is supported, for example, on a base plate 40 from a bracket 41 held in place by fastener 42. Bracket 41 may take the form of means for clamping the combined lasing-cooling structure 1 within a thermally insulating ring 43. The structure of the elliptical cavity 3 is cooperatively supported upon base 40 through the agency of fasteners 44 and 45.

One feature of the present invention is particularly concerned with advantageous aspects of the combined lasing-cooling structure 1. This structure includes, as mentioned above, a rod 30 of active laser material which may, for instance, be a rod of garnet that is doped with a particular ion whose presence fosters the stimulated amplification of coherent optical radiation. For the purpose of forming an optical resonator, rod 30 is supplied with thin optically reflecting films 31, 32 on its parallel-ground end faces. Film 31 is generally totally reflecting, while film 32 is partially reflecting, permitting an intense beam of coherent optical radiation to pass through the film 32 for use external of the inventive apparatus.

Rod 30 is confined, with its end film 31 substantially flush with the end 38 of tube 33, within the hollow optically refractive tube 33 (or sheath), which may be, for instance made of clear sapphire. The relatively thick-walled tube or sheath 33 encompasses the complete length of rod 30 and extends well past the partially reflecting film 32 and through aperture 11 of end wall 6 on out of cavity 3 to point 34. The phrase "thick walled" is used here to mean that the thickness of the tube wall is in the order of the diameter of the bore in tube 33.

The active laser rod 30 may be cemented within tubular sheath 33 by employing a suitable transparent cement. Any of several materials are useful for this purpose, including Canada balsam and clear epoxy. Since all of the parts of composite structure 1 operate at a very low temperature, ordinary viscous fluids are satisfactory as long as they do not absorb pumping radiation from lamp 2. For instance, tubular sheath 33 may be telescoped over rod 30 after the cylindrical surface of rod 30 is coated with such a viscous fluid. In operation at cryogenic temperatures, the viscous fluid becomes a natural solid, bonding the parts 30 and 34 together. Adhesives which form transparent solids may also be employed.

Alternatively, the portion of the composite structure 1 including the active medium of rod 30 and the transparent tubular sheath 33 may be formed by a conventional crystal drawing process. For example, the composite structure including rod 30 and sheath 33 may be made by first preparing the core rod 30 by making a single crystal of garnet or similar material, grinding, polishing, and coating its ends 31 and 32, and then using the crystal rod as a seed on which to grow a tube 33 of suitable material.

The composite structure 1 may be completed by coating onto the exterior cylindrical surface of the end 34 of sapphire tube 33 a suitable heat transferring cement and then telescoping over tube 33 a drilled-out copper cylinder 35. The accessible ends of the borders between sapphire tube 33 and copper cylinder 35 may be coated with any suitable epoxy cement further to hold copper block 35 in place.

As noted previously, the active lasing material of rod 30 is supported via sapphire tube 33 and the copper cylinder 35 from base 40 by bracket 41. The copper cylinder 35 is also supplied with a multiplicity of turns of copper tubing 36 soldered on its outer wall, through which turns any suitable cryogenic cooling material may be circulated. Liquid nitrogen is an example of a useful coolant.

The lasing material of rod 30 is thus cooled by thermal conduction of heat from its surface through the volume of the sapphire tube 33. Heat then flows into the copper cylinder 35 and is removed from the equipment by the coolant flowing in copper tubing 36. The relatively thick-walled nature of sapphire tube 33 aids in focussing light from the pump lamp 2 on the laser rod 30 and correspondingly aids in the efficient removal of heat from it.

In the invention, an important feature of the means of cooling depends upon recognition of the singular properties of the crystalline sapphire material of tube 33. First, it has the important property that it is transparent to electromagnetic radiation over a relatively wide range; that is, it is transparent at substantially all wave lengths at which the pumping lamp 2 radiates. Such transparency permits substantially all of the radiant energy from the pumping lamp 2 to reach laser rod 30.

In addition, the coefficient of thermal conductivity of sapphire is quite large. For example, it is considerably larger than brass and is, in fact, larger than copper over certain cryogenic ranges, such as from 30° to 80° Kelvin. By way of example, the thermal conductivity of sapphire reaches 60 watts per centimeter degrees Kelvin near 40° Kelvin.

It is known that the thermally conductivity of sapphire is not isotropic; in fact, conductivity perpendicular to the $c$-axis of the crystal is on the order of 100 times smaller than the conductivity at 35° to the $c$-axis. Similar high thermal conductivity is achieved with use of conduction parallel to the crystalline $c$-axis. Accordingly, it is preferred to place the $c$-axis of the crystalline sapphire rod 30 substantially parallel to the axis of the composite structure 1.

While some of the undesired thermal energy appearing within the active lasing medium of rod 30 does flow radially out of the surface 37 of the sapphire tube 33 and this may contribute something to cooling the lasing material of rod 30, exchange of heat into a gas or into a vacuum environment across the surface 37 of the sapphire material is relatively poor. On the other hand, at temperatures desirable for the operation of certain lasing materials, the longitudinal path provided by a properly oriented transparent sapphire tube or sheath 33 out of cavity 3 is a highly efficient path for thermal flow especially if, as is practiced in the present invention, the portion of sapphire tube 33 external of cavity 3 is intensely cool.

For example, the present invention may also be applied to facilitating efficient operation of a laser employing any one of a number of suitable garnet materials, such as yttrium aluminum garnet doped with holmium or similar garnet materials doped with erbium. Several such materials lase efficiently at low temperatures such as 77° Kelvin but offer little potential at higher temperatures. The novel method of cooling of the present invention provides a significant improvement because elements of the cooling system now occupy a considerably reduced volume within the laser pump cavity 3. Consequently, the laser pump cavity 3 may be desirably reduced in size.

The efficiency of pumping action is correspondingly increased, as the surface of wall 5 of the laser cavity 3 is reduced relative to the surface area of the laser rod 30. Relatively more pumping energy is then absorbed in the laser rod 30, and relatively less in the wall 5 of cavity 3. Pump efficiency may further be increased by optically polishing the pump cavity wall 5 and making it more highly reflecting by vacuum depositing a layer of gold upon the wall surface.

Figure 3:
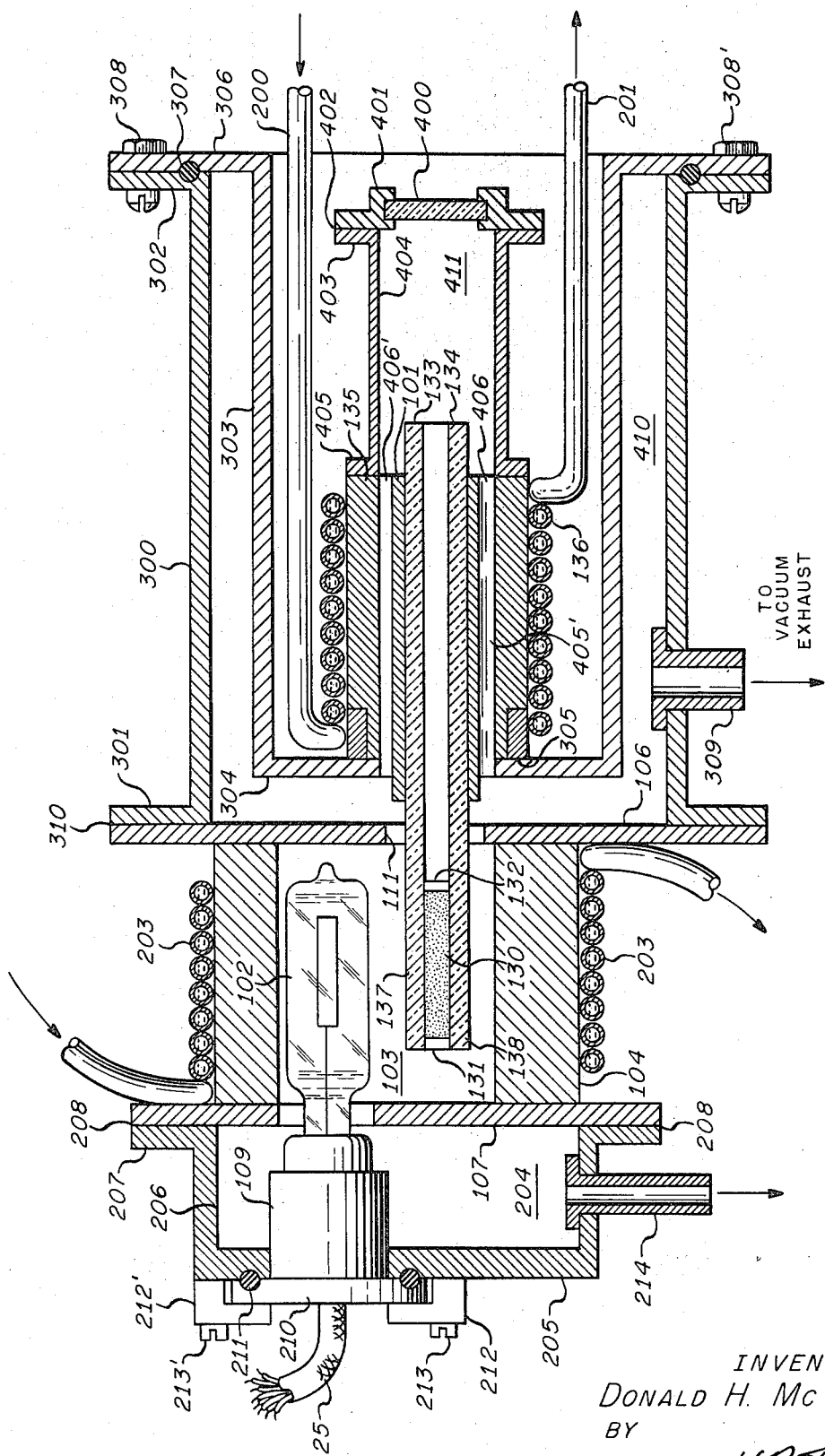
FIG. 3 is a cross-section view of another form of the invention.

As noted previously, a feature of the invention lies in the fact that it enables the use of a practical and convenient configuration for cryogenic cooling of laser media in which parts primarily concerned with cooling may be located exterior of the pump cavity insofar as possible. FIG. 3 illustrates such a form of the invention, particularly showing an arrangement with minimum interference between pumping and cooling functions of the apparatus.

Figure 2:
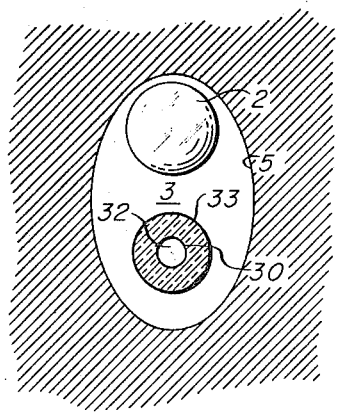
FIG. 2 is a sectional view of the elliptical laser device of FIG. 1.

Referring to FIG. 3, it is observed that parts which correspond to parts found in FIGS. 1 and 2 are identified by similar reference numerals; but in FIG. 3, a factor of 100 has been added. Cooperation of these similar parts is similar to their cooperation in FIGS. 1 and 2, so that their structure and operation need not be explained here in detail. However, FIG. 3 illustrates an embodiment of the invention again including as principal elements a composite lasing and cooling system 101, a high intensity lamp 102 for stimulating lasing action, and an optical pumping cavity 103 surrounding a portion of the composite lasing-cooling system 101 and the pumping lamp 102. As before, the optical cavity 103 is elliptical in cross-section, and is defined by an enclosure or casing 104 partly closed at its ends by apertured flat end walls 106 and 107. Aperture 108 in end wall 107 provides means for inserting within the cavity 103 the emission stimulating lamp 102, illustrated as mounted in a socket 109 and supplied with electrical power via input leads 125.

A second apertured wall 106 forms an end wall for cavity 103 opposite end wall 107. The combined lasing-cooling configuration 101 projects through aperture 111 in end wall 106 into the cavity 103 and includes a rod 130 of active laser material. The laser rod 130 and lamp 102 are placed at opposite focal lines of elliptical wall 105.

As previously discussed with reference to FIGS. 1 and 2, the composite lasing-cooling configuration 101 includes a rod 130 of active lasing material supplied with thin optically reflecting films 131, 132 on its parallel-ground end faces. Film 131 may be totally reflecting, while film 132 is partially reflecting, permitting a beam of stimulated coherent radiation to pass through the film 132 for use external of the invention.

The lasing rod 130 is suitably supported within a hollow tubular sheath 133 of optically refractive material such as sapphire. The relatively thick-walled sheath 133 encompasses the complete length of rod 130 and extends well past the partially reflecting film 132 through aperture 111 of end wall 106 and out of cavity 103 to an end point 134. The tubular sheath 133 is preferably made of clear sapphire cut with its crystalline $c$-axis substantially parallel to the longitudinal axis of the composite lasing-cooling configuration 101.

The composite configuration 101 is completed by the drilled-out copper cylinder 135 telescoped over the end 134 of tubular sheath 133. As noted previously, the active lasing material of rod 130 is supported via sapphire sheath or tube 133 and the copper cylinder 135. Copper cylinder 135 is supplied with a multiplicity of turns of copper tubing 136 through which any suitable cryogenic cooling material may be circulated via respective input and output tubes 200, 201.

The lasing material of rod 130 is thus cryogenically cooled by thermal conduction of heat from its surface through the volume of the sapphire sheath 133. Heat then flows into the copper cylinder 135 and is removed from the equipment by the cryogenic coolant flowing in copper tubing 200, 136, 201. If desired, a coolant such as water may be passed through copper tubes 203 wound about and soldered to the exterior surface of casing 104.

Certain elements of the invention yet to be described in connection with FIG. 3 play a primary role in supporting the principal elements of the invention in an evacuated environment so as to prevent objectionable formation of condensate upon those principal elements. Alternatively, an inert gas at a near vacuum pressure level that does not significantly absorb energy from the radiation of lamp 102 and that is not itself condensable at the operating temperature of laser rod 130 may be employed as an operating environment.

Referring now particularly to lamp 102 and socket 109, socket 109 is supported in a cylindrical region 204 having an apertured end wall 205 and a cylindrical wall portion 206. Wall 206 has a radially extending annular flange 207 at its inner end which may be fastened by any well-known means for perfecting a vacuum tight joint 208 between flange 207 and wall 107.

Wall 205 is provided with an aperture 209 for facilitating mounting of socket 109 and for permitting its withdrawal from cavity 103 when inspection or replacement of lamp 102 is desired. Socket 109, which may be water cooled by conventional means, is supported on a base plate 210 held against a suitable vacuum gasket 211 by clamps 212 and 212' urged against base plate 210 by screws 213 and 213'. In the well known manner, a vacuum tight or hermetic seal is formed when screws 213, 213' are tightened, causing gasket 211 to form intimate hermetic or vacuum seals at its annular contact with end wall 205 and at its annular contact with base plate 210. Evacuation of the interior of the structure, especially its interior in the vicinity of cavity 103 and volume 204, may be additionally faciliated by attaching suitable vacuum pumping equipment (not shown) to an exhaust tube 214 which is hermetically sealed through wall 206.

A second portion of the vacuum enclosure cooperates with wall 106 and forms means particularly for supporting the composite laser-cooling structure 101. This supports structure includes a thin walled cylinder 300, which may be composed of stainless steel or of any material having such a low heat conductivity. Cylindrical wall 300 is provided at one end with a radially extending flange 301 suitable for fastening to end wall 106 by brazing or by other known means for forming a vacuum tight seal at juncture 310. At the end of cylinder 300 opposite flange 301 is provided a similar radially extending flange 302.

Flange 302 acts to support within cylinder 300 a second but smaller-in-diameter cylindrical wall 303, also made of thin walled stainless steel. Cylindrical wall 303 is provided with an inwardly extending apertured plate or flange 304, also of thin stainless steel. Flange 304 is vacuum or hermetically sealed at the boundary 305 between it and metal block 135.

To facilitate mounting cylindrical wall 303 within cylindrical wall 300, wall 303 is provided with an outwardly extending flange 306. Flanges 302 and 306 are adapted to form a vacuum tight or hermetic seal. For this purpose, screws 308, 308' cooperate with flanges 302 and 306. When screws 308, 308' are tightened, the annular gasket 307 between them is caused to form a hermetic or vacuum seal between itself and flange 302 and a second such seal between itself and flange 306 in the well known manner.

The composite laser-cooling structure 101 is thus supported within a double walled cylindrical configuration so that the active laser rod 130 is accurately positioned at a focal line of cavity 103. Furthermore, the composite structure 101 is supported in a volume 410 whose evacuation may be aided by pumping any atmosphere it contains by well-known vacuum pump means (not shown) attached to an exhaust tube 309 which perforates wall 300 and is vacuum sealed therein. A further function of the composite support-envelope system is that the coaxially arranged thin cylindrical walls 300 and 303 together form a long and relatively poor heat conduction path. Thus, the composite laser-cooling structure 101 is substantially thermally isolated from the wall or casing 105 of cavity 103.

Radiation from the lasing material 130 passes through the hollow space within tube 133 and out past its end 134. Since the high intensity radiation must be permitted to flow out of the apparatus for external use, a suitable transparent window 400 is supplied adjacent end 134 of tube 133. Window 400 may be supported within an apertured disk 401, being sealed thereto by any known vacuum tight sealing method. Disk 401 is, in turn, sealed at junction 402 to a radially extending flange 403 located at the window end of the thin walled stainless steel tube 404. Cylindrical wall 404 is, in turn, provided with a radial flange 405 hermetically sealed to metal block 135.

Cylindrical wall 404 is seen to provide support means for window 400 and also, together with window 400 and plate 401, to complete the vacuum envelope about volume 411 of the apparatus. Because cylindrical wall 404 is made of stainless steel and is relatively long, it forms a poor heat path from metal block 135 toward window 400; thus, both sides of window 400 are maintained relatively free of condensate during the operation of the apparatus.

An output exhaust tube (not shown) may be sealed within cylindrical wall 404 to permit evacuation of its contents from volume 411. Alternatively, one or more channels 406 and 406' may be drilled within metal block 135 in such a manner as directly to connect all volumes to be evacuated by tubes 214 or 309 with the volume 411 sealed within cylindrical wall 404.

It is thus seen that means have been provided in FIG. 3 for permitting the principal elements of the invention, as illustrated in FIGS. 1 and 2, to be placed in an evacuated environment so as to prevent formation of condensate upon those principal elements, which condensate might otherwise form and degrade operation of the invention because of the low operating temperature of the combined laser-cooling structure 101. It is seen that the additional elements described in connection with FIG. 3 have added roles to play, including mechanical support of primary elements such as lamp 102, lasing-cooling configuration 101, and window 400. They also serve as low thermal conductivity paths, preventing undesired flow of heat along the respective mechanical support structures and into the configuration 101.

Furthermore, it is seen that the arrangement disclosed in FIG. 3 permits ready removal of lamp 102 and its substitution by a similar lamp or by a lamp having a different radiation characteristic. Also permitted is the removal of the combined laser-cooling configuration 101 for the purpose of inspection or of replacement of rod 130 with a similar rod in the event it is found to be damaged, or permitting its replacement with a rod of a different lasing material, if desired. It is within the scope of the invention to replace demountable vacuum joints, for example, at 211 or 307 with permanently sealed joints, or to substitute any permanently sealed joint with a demountable vacuum joint, as desired.

From the foregoing, it is clear that the inventive concept provides means for overcoming the serious deficiencies of the prior art in providing a novel composite lasing and cooling configuration wherein heat generated within a lasing medium is efficiently and effectively removed from the medium and is transferred to a heat sink remote from the laser medium and its pump cavity. The composite lasing and cooling system employs a tube or sheath surrounding the lasing medium for performing the heat transfer function.

As has been described, several beneficial properties of the material of the tube or sheath are exploited by the invention. In particular, the selected material is transparent to substantially all wave lengths of electromagnetic energy radiated by the pump lamp and the sheath acts efficiently to focus substantially all of that radiated energy upon the laser material. Substantially none of the pump lamp energy is absorbed directly within the sheath, so that substantially all of the pump energy reaches the desired site and therefore cannot itself raise the temperature of the sheath and, more important, of the contiguous lasing material to an undesirable extent. Selection of an ideal material for the sheath is important to the success of the invention, since any energy that might be absorbed by the sheath would also have to be dissipated. The presence of any such extra heat source would effectively result in an increased temperature gradient between the laser medium and the external heat sink, and is avoided by the inventive composite lasing and cooling system. Further, a sheath oriented as described above with respect to its $c$-axis forms an efficient heat path from the lasing material to the heat sink, and has other mechanical and optical properties ideally compatible with the material parts with which it cooperates. While sapphire has been used in the foregoing discussion as one practical example of a suitable material for the sheath, any other material having similar beneficial properties may be employed.

While the invention has been described in its preferred embodiment, it is to be understood that the words which have been used are words of description rather than limitation and that changes may be made without departure from the true scope and spirit of the invention in its broader aspects.

I claim

1. In combination:
   an elongate body of lasable material having a substantially cylindrical surface and first and second ends,
   said lasable body having a length between said ends substantially greater than the transverse dimension of said body,
   reflective means at said ends for forming an energy radiating resonant cavity about said lasable body,
   an elongate homogeneous body of material relatively transparent in the wave length range suitable for pumping said lasable body,
   said transparent body taking the form of a hollow tube having substantially coaxial inner and outer surfaces,
   said cylindrical surface of said lasable body being disposed in intimate contact with said inner surface of said transparent hollow tube for efficient transfer of heat from said lasable body to said hollow tube over substantially the total area of said cylindrical surface of said lasable body,
   an elongate metal body of relatively high heat conductivity,
   said body taking the form of a hollow metal element having a substantially cylindrical inner surface,
   said outer surface of said transparent hollow tube being disposed in intimate contact with said inner surface of said metal body for efficient transfer of heat from said transparent hollow tube to said metal body over substantially the total area of said cylindrical inner surface of said metal body,
   means for cooling said metal body,
   said metal body being spaced on said transparent hollow tube from said lasable body in non-overlapping relation therewith,
   means for projecting pumping energy through said body of transparent material for substantially uniformly illuminating the total of said cylindrical surface of said lasable material, and wherein said elongate tubular body of transparent material has an effective direction of heat conductivity lying substantially parallel to said inner and outer coaxial surface of said elongate hollow tubular body for efficient transfer of heat from said lasable body to said metal body.

2. Apparatus as described in claim 1 wherein said elongate tubular body of transparent material is comprised of crystalline sapphire having its most effective direction of heat conductivity lying substantially parallel to said inner and outer coaxial surfaces of said elongate hollow tubular body for efficient transfer of heat from said lasable body to said metal body.

* * * * *